United States Patent

Imai

Patent Number: 5,969,655
Date of Patent: Oct. 19, 1999

[54] DIGITAL CONVERGENCE CORRECTION DEVICE OUTPUTTING AN ANALOG CORRECTION SIGNAL

[75] Inventor: Masashi Imai, Ibaraki, Japan

[73] Assignee: Matsushida Electric Industrial Co., Ltd., Osaku-Fu, Japan

[21] Appl. No.: 08/757,690

[22] Filed: Dec. 3, 1996

[30] Foreign Application Priority Data

Dec. 15, 1995 [JP] Japan ................................. 7-326744
Jan. 23, 1996 [JP] Japan ................................. 8-008916

[51] Int. Cl.⁶ ............................. H03M 1/00; H04N 9/28
[52] U.S. Cl. ....................... 341/144; 315/367; 348/807; 341/101
[58] Field of Search ................................. 341/101, 144; 315/367, 368.11, 368.12, 370; 348/807

[56] References Cited

U.S. PATENT DOCUMENTS

| | | | |
|---|---|---|---|
| 4,473,844 | 9/1984 | Klein | 358/163 |
| 4,754,204 | 6/1988 | Ando et al. | 315/367 |
| 5,298,985 | 3/1994 | Tsujihara et al. | 348/745 |
| 5,473,224 | 12/1995 | Tsujihara et al. | 315/368.18 |

FOREIGN PATENT DOCUMENTS

| | | |
|---|---|---|
| 63-1186 | 1/1988 | Japan . |
| 1-280986 | 11/1989 | Japan . |
| 3-285485 | 12/1991 | Japan . |
| 5-244615 | 9/1993 | Japan . |

Primary Examiner—Howard L. Williams
Attorney, Agent, or Firm—Panitch Schwarze Jacobs & Nadel, P.C.

[57] ABSTRACT

A digital convergence correction device converts correction data into serial data by using a parallel/serial converter, and further converts the serial data into an analog correction signal by using a serial input type digital/analog converter, and outputs the analog correction signal in order to correct misconvergence.

7 Claims, 7 Drawing Sheets

DIGITAL CONVERGENCE CORRECTION DEVICE OUTPUTTING AN ANALOG CORRECTION SIGNAL

FIELD OF THE INVENTION AND RELATED ART STATEMENT

1. Field of the Invention

The present invention relates to a digital convergence correction device which corrects misconvergence of image in a color television receiver.

2. Description of the Related Art Statement

A digital convergence correction device is used in a color television receiver which forms images in desired colors by composing three color images of red, green, and blue on a screen such as a fluorescent screen or a projection screen. The digital convergence correction device corrects misconvergence of image by using digital correction data. For example, in a projection display device, the misconvergence is produced on the screen depending on optical conditions such as a centralization angle of the three color images on the screen, and projection angles of the three color images against the screen.

In order to overcome the misconvergence, the digital convergence correction device provides plural adjustment points on the screen by using test pattern signals such as cross hatch signals. The plural adjustment points consist of, for example, 15 points and 9 points in a horizontal direction and a vertical direction, respectively. Then, the digital convergence correction device calculates digital correction data at each one of the plural adjustment points, and stores the correction data in a memory. The digital convergence correction device reads the correction data from the memory in synchronization with a horizontal deflection pulse and a vertical deflection pulse, and converts the correction data into an analog correction signal. In reading the correction data, the correction data are divided into horizontal and vertical correction data for red, green, and blue. Thereafter, the digital convergence correction device outputs the analog correction signal to a convergence coil via an amplitude circuit, and thereby, the misconvergence is corrected.

The first conventional digital convergence correction device disclosed in Japanese Laid-open Patent application HEI No. 3-285485 will be explained with reference to FIG. 6.

Figure 6:
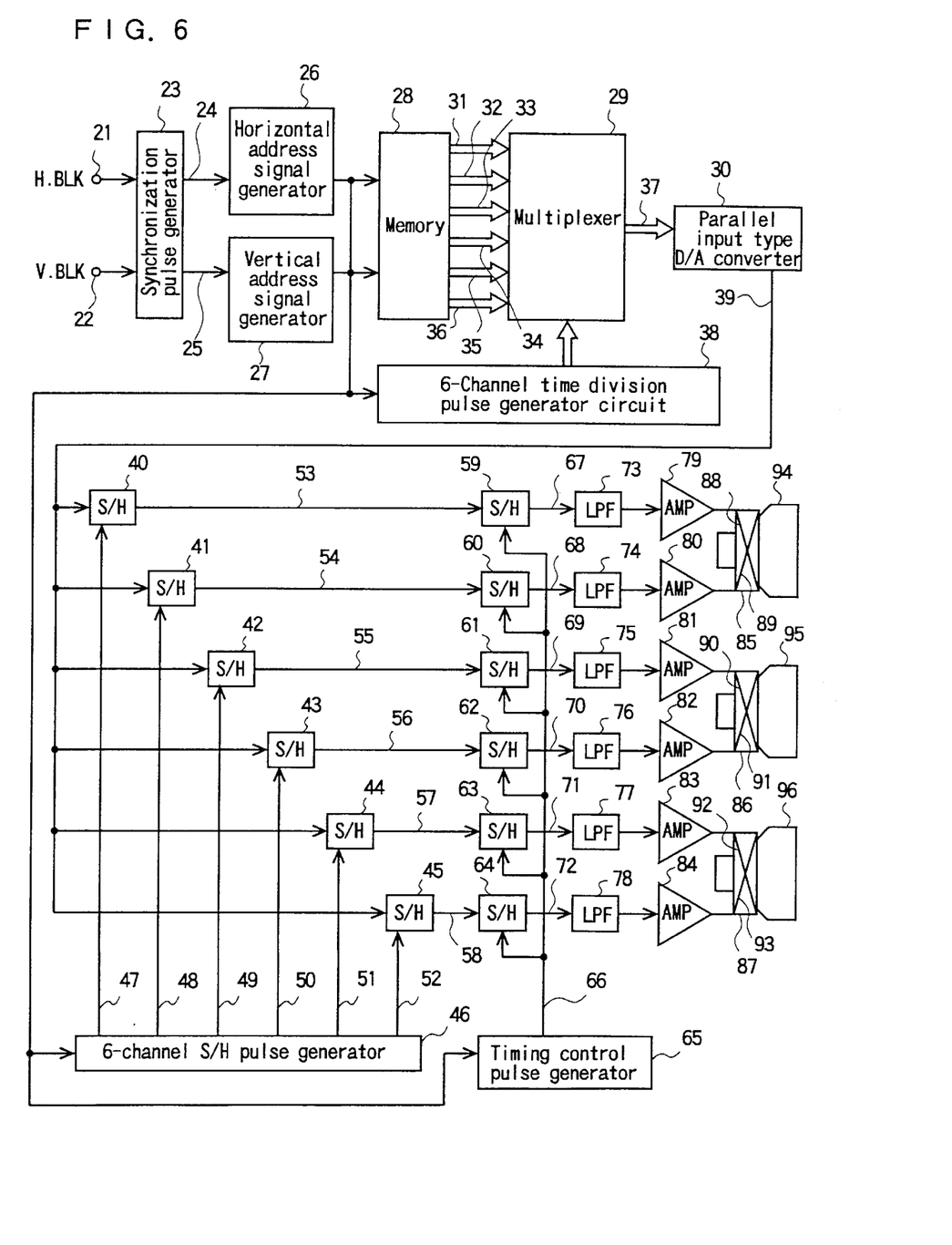
FIG. 6 is a block diagram showing a first conventional digital convergence correction device.

FIG. 6 is a block diagram showing a first conventional digital convergence correction device.

In FIG. 6, a synchronization pulse generator 23 receives a horizontal blanking pulse and a vertical blanking pulse through an input terminal 21 and an input terminal 22, respectively. The synchronization pulse generator 23 outputs a horizontal synchronization pulse 24 and a vertical synchronization pulse 25 to a horizontal address signal generator 26 and a vertical address signal generator 27 in synchronization with the horizontal blanking pulse and the vertical blanking pulse, respectively.

The horizontal address signal generator 26 generates horizontal address signals, and outputs the horizontal address signals to a memory 28, a 6-channel time division pulse generation circuit 38, a 6-channel S/H pulse generator 46, and a timing control pulse generator 65. Similarly, the vertical address signal generator 27 generates vertical address signals, and outputs the vertical address signals to the memory 28, the 6-channel time division pulse generation circuit 38, the 6-channel S/H pulse generator 46, and the timing control pulse generator 65.

These horizontal and vertical address signals designate a position on the screen corresponding to each one of the plural adjustment points. By reading the data of these address signals, it is possible to output from the memory 28 the convergence correction data required in the position are outputted.

The memory 28 is connected to a multiplexer 29, and outputs first, second, third, fourth, fifth, and sixth correction data 31 - - - 36 to the multiplexer 29 through separate signal lines. Each number of the signal lines is equal to each bit length of the six correction data 31 - - - 36.

The first and the second correction data 31 and 32 are converted into the correction signals to drive a horizontal convergence coil 88 and a vertical convergence coil 89, respectively. The horizontal convergence coil 88 and the vertical convergence coil 89 are wound around a convergence yoke 85 mounted on a projection cathode-ray tube 94 for the red image.

The third and the fourth correction data 33 and 34 are converted into the correction signals to drive a horizontal convergence coil 90 and a vertical convergence coil 91, respectively. The horizontal convergence coil 90 and the vertical convergence coil 91 are wound around a convergence yoke 86 mounted on a projection cathode-ray tube 95 for the green image.

The fifth and the sixth correction data 35 and 36 are converted into the correction signals to drive a horizontal convergence coil 92 and a vertical convergence coil 93, respectively. The horizontal convergence coil 92 and the vertical convergence coil 93 are wound around a convergence yoke 87 mounted on a projection cathode-ray tube 96 for the blue image.

The multiplexer 29 performs a time-sharing for the above-mentioned six correction data 31 - - - 36 in accordance with a timing pulse issued from the 6-channel time division pulse generator circuit 38, and outputs multiplex data 37 to a parallel input type digital/analog (hereinafter referred to as a "D/A") converter 30. The D/A converter 30 converts the multiplex data 37 into an analog signal 39, and outputs the analog signals 39 to the first sample and hold circuits 40 - - - 45.

The first sample and hold circuits 40 - - - 45 form six correction signals 53 - - - 58 corresponding to the six correction data 31 - - - 36 by sampling and holding the analog signal 39 in accordance with pulses 47 - - - 52 issued from the 6-channel S/H pulse generation 46, respectively. Then, the first sample and hold circuits 40 - - - 45 output the analog signals 53 - - - 58 to second sample and hold circuits 59 - - - 64, respectively.

The second sample and hold circuits 59 - - - 64 output analog signals 67 - - - 72 to low pass filters 73 - - - 78 at the same timing in accordance with a timing pulse 66 from the timing control pulse generator 65, respectively. The low pass filters 73 - - - 78 output analog signals to amplitude circuits 79 - - - 84, respectively, for amplification.

Thus, in the first conventional digital convergence correction device, the multiplexer 29 performs the time-sharing for the six correction data 31 - - - 36 and the D/A converter 30 converts the multiplex data 37 into the analog signal 39. Subsequently, the first sample and hold circuits 40 - - - 45 divide the analog signal 39 into the six correction signals 53 - - - 58, respectively.

However, in the first conventional digital convergence correction device, the multiplexer 29 performs the time-sharing for the six correction data 31 - - - 36 from the memory 28, and output the multiplex data 37 to the D/A converter 30. Thereby, there are problems that many signal lines are required to connect between the memory 28 and the multiplexer 29, and to connect between the multiplexer 29 and the D/A converter 30.

Furthermore, each number of the signal lines is equal to each bit length of the six correction data 31 - - - 36. Therefore, if the bit length is increased in order to improve precision of the correction data, there occurs a problem that the digital convergence correction device is enlarged in size.

The second conventional digital convergence correction device disclosed in Japanese Laid-open Patent application HEI No. 5-244615 will be explained with reference to FIG. 7.

Figure 7:
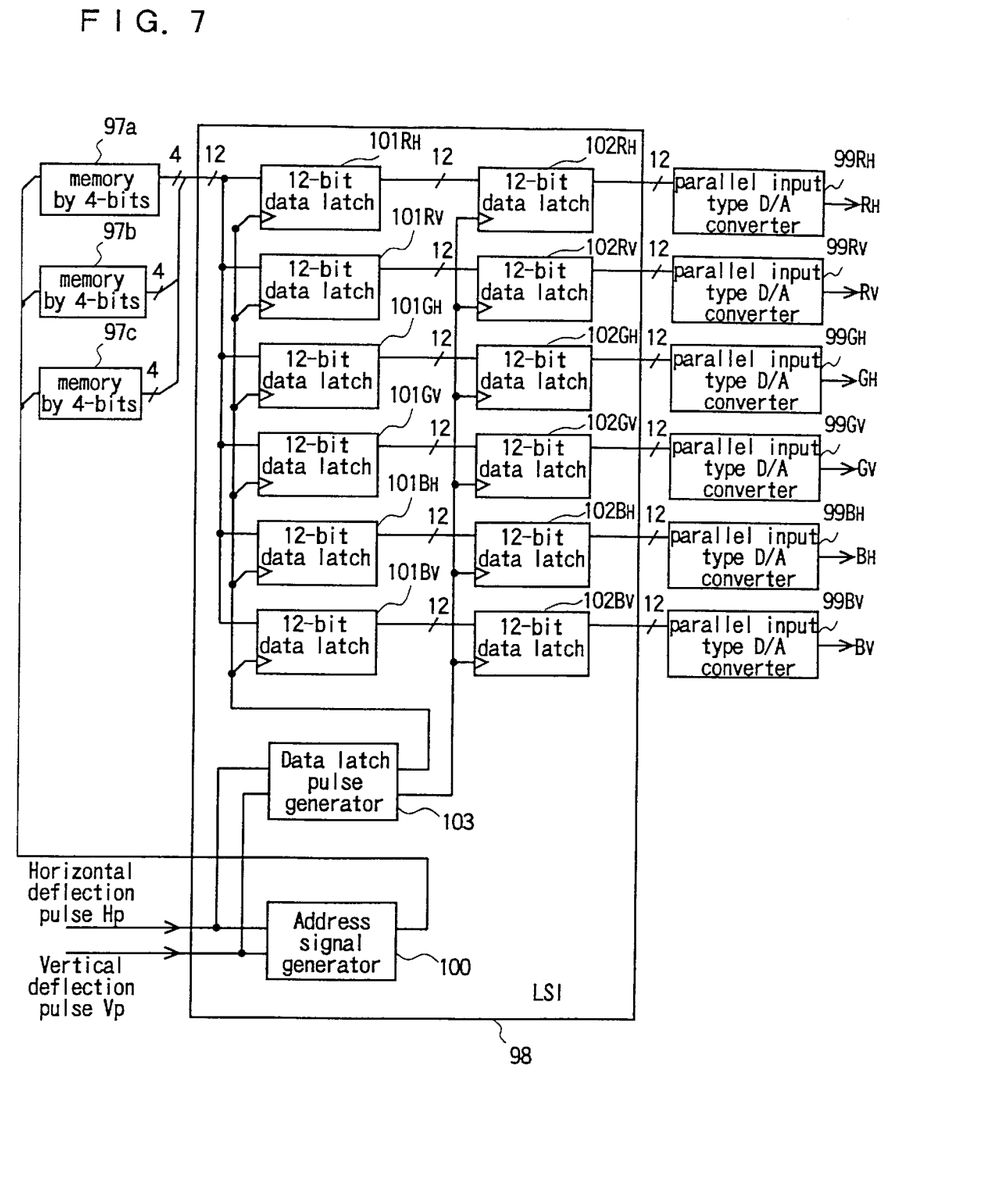
FIG. 7 is a block diagram showing a second conventional digital convergence correction device.

FIG. 7 is a block diagram showing a second conventional digital convergence correction device.

In FIG. 7, the digital convergence correction device comprises three memories by 4-bits 97a, 97b, and 97c, an LSI 98 connected with the three memories by 4-bits 97a, 97b, and 97c, and six parallel input type D/A converters 99RH, 99RV, 99GH, 99GV, 99BH, and 99BV connected with the LSI 98. The LSI 98 receives a total of 12-bit correction data from the three memories by 4-bits 97a - - - 97c, and divides the 12-bit correction data into 6-channel 12-bit correction data consisting of the horizontal and the vertical correction data for red, green, and blue.

Each of the D/A converters 99RH, 99RV, 99GH, 99GV, 99BH, and 99BV receives the corresponding one of the 6-channel 12-bit correction data from the LSI 98, and converts the 12-bit correction data into the analog correction signal.

The LSI 98 includes an address signal generator 100 for generating the horizontal and the vertical address signals, first 12-bit data latches 101RH, 101RV, 101GH, 101GV, 101BH, and 101BV connected with the memories by 4-bits 97a - - - 97c. The address signal generator 100 generates the horizontal and the vertical address signals in accordance with the horizontal and the vertical deflection pulses Hp and Vp, respectively.

Each of the first 12-bit data latches 101RH, 101RV, 101GH, 101GV, 101BH, and 101BV inputs and latches the corresponding one of the 6-channel 12-bit correction data from the 4-bit memories 97a - - - 97c. Furthermore, the LSI 98 has second 12-bit data latches 102RH, 102RV, 102GH, 102GV, 102BH, and 102BV connected to the first 12-bit data latches 101RH, 101RV, 101GH, 101GV, 101BH, and 101BV, respectively, and a data latch pulse generator 103 for controlling the first and the second 12-bit data latches 101RH, 101RV, 101GH, 101GV, 101BH, and 101BV, and 102RH, 102RV, 102GH, 102GV, 102BH, and 102BV. The second 12-bit data latches 102RH, 102RV, 102GH, 102GV, 102BH, and 102BV are connected with the D/A converters 99RH, 99RV, 99GH, 99GV, 99BH, and 99BV, respectively.

In the second conventional digital convergence correction device, the 12-bit correction data are read from the 4-bit memories 97a - - - 97c to the LSI 98 based on the horizontal and the vertical address signals issued from the address signal generator 100. The first 12-bit data latches 101RH and 101RV hold the horizontal and the vertical correction data for red, respectively, in accordance with the latch pulse issued from the data latch pulse generator 103.

Furthermore, the first 12-bit data latches 101RH and 101RV output the horizontal and the vertical correction data for red to the second 12-bit data latches 102RH and 102RV, respectively, in accordance with the latch pulse. Similarly, the first 12-bit data latches 101GH and 101GV hold the horizontal and the vertical correction data for green, respectively, in accordance with the latch pulse.

The first 12-bit data latches 101GH and 1O1GV output the horizontal and the vertical correction data for green to the second 12-bit data latches 102GH and 102GV, respectively, in accordance with the latch pulse. Similarly, the first 12-bit data latches 101BH and 101BV hold the horizontal and the vertical correction data for blue, respectively, in accordance with the latch pulse. Furthermore, the first 12-bit data latches 101BH and 101BV output the horizontal and the vertical correction data for blue to the second 12-bit data latches 102BH and 102BV, respectively, in accordance with the latch pulse.

The second 12-bit data latches 102RH, 102RV, 102GH, 102GV, 102BH, and 102BV output the 6-channel 12-bit correction data at the same timing to the D/A converters 99RH, 99RV, 99GH, 99GV, 99BH, and 99BV, respectively, in accordance with the latch pulse issued from the data latch pulse generator 103. Each of the D/A converters 99RH, 99RV, 99GH, 99GV, 99BH, and 99BV converts the corresponding one of the 6-channel 12-bit correction data into the analog correction signal, and outputs the analog correction signal to an unillustrated convergence coil.

However, even in the second conventional digital convergence correction device, if the bit length is increased in order to improve precision of the correction data, it is necessary to increase the number of signal lines among the 4-bit memories 97a - - - 97c and the LSI 98. Thereby, there occurs the problem that the digital convergence correction device is enlarged in size.

OBJECT AND SUMMARY OF THE INVENTION

The object of the present invention is to provide a digital convergence correction device that can solve the aforementioned problems.

In order to achieve the above-mentioned object, a digital convergence correction device in accordance with the present invention comprises:

at least one parallel/serial converter for converting the digital correction data into serial data, and at least one serial input type digital/analog converter is connected with the at least one parallel/serial converter, and is for converting the serial data into the analog correction signal.

According to the digital convergence correction device of the present invention, the parallel/serial converter converts the digital correction data into the serial data. Furthermore, the serial input type digital/analog converter converts the serial data into the analog correction signal.

Thereby, it is possible that the digital correction data are outputted from parallel/serial converter to the serial input type digital/analog converter by one signal line only in no relation with bit length of the digital correction data. As a result, if the bit length is increased in order to improve precision of the digital correction data, it is prevented that the digital convergence correction device is enlarged in size.

Furthermore, in order to achieve the above-mentioned object, another digital convergence correction device in accordance with the present invention comprises:

a memory by 8-bits for storing 8-bit digital correction data, at least one pair of 8-bit data latches is connected to the memory by 8-bits, and is for holding two series of the 8-bit digital correction data from the memory by 8-bits, at least one 16-bit data latch is connected to at least one pair of 8-bit data latches, and is for forming 16-bit digital correction data with the two series of the 8-bit digital correction data from at least one pair of 8-bit data latches.

By the above-mentioned construction, in this digital convergence correction device, it is possible to extend the bit length of the correction data without increasing the bit length of the memory. As a result, the precision of the correction data for the misconvergence can be easily improved.

DESCRIPTION OF THE PREFERRED EMBODIMENTS

The preferred embodiments of the digital convergence correction device of the present invention will be described with reference to the accompanying drawings.

First Embodiment

Figure 1:
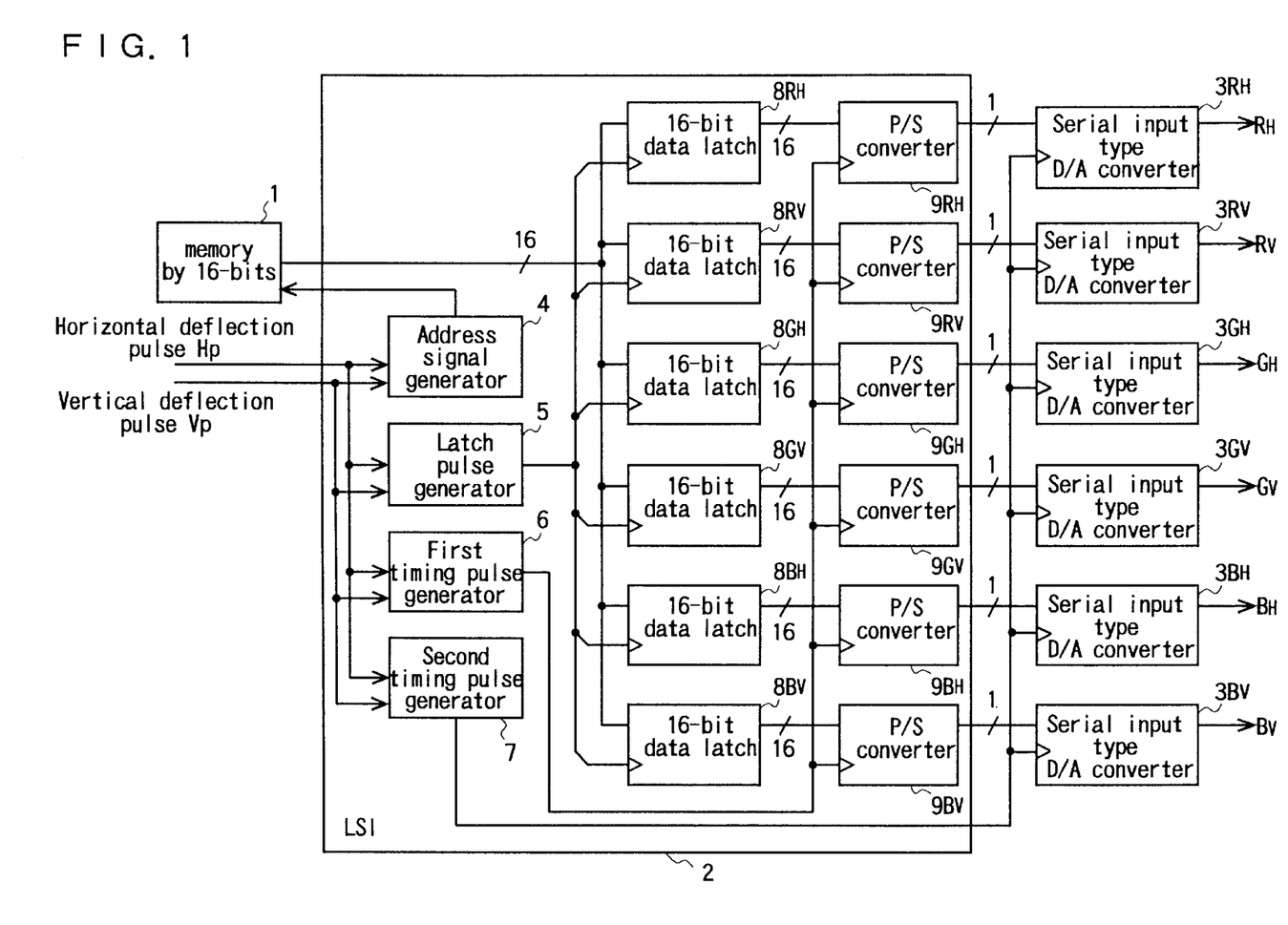
FIG. 1 is a block diagram showing a digital convergence correction device of a first embodiment of the present invention.

FIG. 1 is a block diagram showing a digital convergence correction device of a first embodiment of the present invention.

In FIG. 1, the digital convergence correction device comprises a memory by 16-bits 1 for storing 16-bit correction data, an LSI 2 connected with the 16-bit memory 1, and six serial input type digital/analog (hereinafter referred to as a "D/A") converters 3RH, 3RV, 3GH, 3GV, 3BH, and 3BV connected to the LSI 2. The memory by 16-bits 1 stores the 16-bit correction data calculated by a CPU (not shown), and is formed by a RAM such as Sanyo corp., type LC36256AML.

The LSI 2 receives the 16-bit correction data from the memory by 16-bits 1, and divides the 16-bit correction data into 6-channel correction data consisting of horizontal and vertical correction data for red, green, and blue. The D/A converters 3RH and 3RV convert the horizontal and the vertical correction data for red into analog correction signals RH and RV, respectively.

The D/A converters 3GH and 3GV convert the horizontal and the vertical correction data for green into analog correction signals GH and GV, respectively. The D/A converters 3BH and 3BV convert the horizontal and the vertical correction data for blue into analog correction signals BH and BV, respectively.

The memory by 16-bits 1, the LSI 2, and the D/A converters 3RH, 3RV, 3GH, 3GV, 3BH, and 3BV are mounted on a printed-circuit board (not shown) having a size of, for example, 121 mm×121 mm.

The LSI 2 includes an address signal generator 4 for generating horizontal and vertical address signals, a latch pulse generator 5 for generating a latch pulse, a first timing pulse generator 6 for generating a first timing pulse, and a second timing pulse generator 7 for generating a second timing pulse. The address signal generator 4, the latch pulse generator 5, the first timing pulse generator 6, and the second timing pulse generator 7 receive horizontal and vertical deflection pulses Hp and Vp, respectively, issued from horizontal and vertical deflection circuits (not shown).

The address signal generator 4 generates the horizontal and the vertical address signals in accordance with the horizontal and the vertical deflection pulses Hp and Vp, and outputs the horizontal and the vertical address signals to the memory by 16-bits 1. Thereby, plural adjustment points to be corrected misconvergence can be positioned on a screen (not shown) by the horizontal and the vertical address signals. Furthermore, it is possible that the correction data on each one of the plural adjustment points are transmitted from the memory by 16-bits 1 to the LSI 2.

The LSI 2 further includes six 16-bit data latches 8RH, 8RV, 8GH, 8GV, 8BH, and 8BV connected with the memory by 16-bits 1, and six 16-bit parallel/serial (hereinafter referred to as a "P/S") converters 9RH, 9RV, 9GH, 9GV, 9BH, and 9BV connected between the 16-bit data latches 8RH, 8RV, 8GH, 8GV, 8BH, and 8BV and the D/A converters 3RH, 3RV, 3GH, 3GV, 3BH, and 3BV, respectively. The 16-bit data latches 8RH, 8RV, 8GH, 8GV, 8BH, and 8BV are controlled by the latch pulse issued from the latch pulse generator 5.

The 16-bit P/S converters 9RH, 9RV, 9GH, 9GV, 9BH, and 9BV are controlled by the first timing pulse issued from the first timing pulse generator 6. The D/A converters 3RH, 3RV, 3GH, 3GV, 3BH, and 3BV are controlled by the second timing pulse issued from the second timing pulse generator 7. The LSI 2 is formed by an integrated circuit such as Motorola ltd., type TVSA0034.

In the digital convergence correction device of the first embodiment, the address signal generator 4 generates the horizontal and the vertical address signals in accordance with the horizontal and the vertical deflection pulses Hp and Vp. Then, correction data are transmitted from the memory by 16-bits 1 to the LSI 2 based on the horizontal and the vertical address signals.

The correction data thus read are a series of the horizontal and the vertical correction data for red, green, and blue. Therefore, the 16-bit data latches 8RH, 8RV, 8GH, 8GV, 8BH, and 8BV divide the series into 6-channel correction data in accordance with the latch pulse issued from the latch pulse generator 5. The divided correction data are then outputted from the 16-bit data latches 8RH, 8RV, 8GH, 8GV, 8BH, and 8BV to the 16-bit P/S converters 9RH, 9RV, 9GH, 9GV, 9BH, and 9BV, respectively.

The 16-bit P/S converters 9RH, 9RV, 9GH, 9GV, 9BH, and 9BV convert 16-bit correction data into serial data in accordance with the first timing pulse issued from the first timing pulse generator 6, and output the serial data to the serial input type D/A converters 3RH, 3RV, 3GH, 3GV, 3BH, and 3BV, respectively. The D/A converters 3RH, 3RV, 3GH, 3GV, 3BH, and 3BV convert the serial data into the analog correction signals RH, RV, GH, GV, BH, and BV in accordance with the second timing pulse issued from the second timing pulse generator 7, respectively. Furthermore, the D/A converters 3RH, 3RV, 3GH, 3GV, 3BH, and 3BV output the analog correction signals RH, RV, GH, GV, BH, and BV to the respective convergence coils (not shown).

Thus, in the digital convergence correction device of the first embodiment, the correction data for each channel are converted into the serial data by the corresponding one of the 16-bit P/S converters 9RH, 9RV, 9GH, 9GV, 9BH, and 9BV disposed in the LSI 2. Furthermore, each of the serial data is converted into the analog correction signal by the corresponding one of the serial input type D/A converters 3RH, 3RV, 3GH, 3GV, 3BH, and 3BV.

Thereby, each one of the serial input type D/A converters 3RH, 3RV, 3GH, 3GV, 3BH, and 3BV can be connected with the LSI 2 by one signal line only. As a result, if bit length of the correction data is increased in order to improve precision of the correction data, it is prevented that the digital convergence correction device is enlarged in size.

Furthermore, since the serial input type D/A converters 3RH, 3RV, 3GH, 3GV, 3BH, and 3BV are commonly used in audio appliances such as CD player, it is possible to use some common components with the audio appliances.

Second Embodiment

Figure 2:
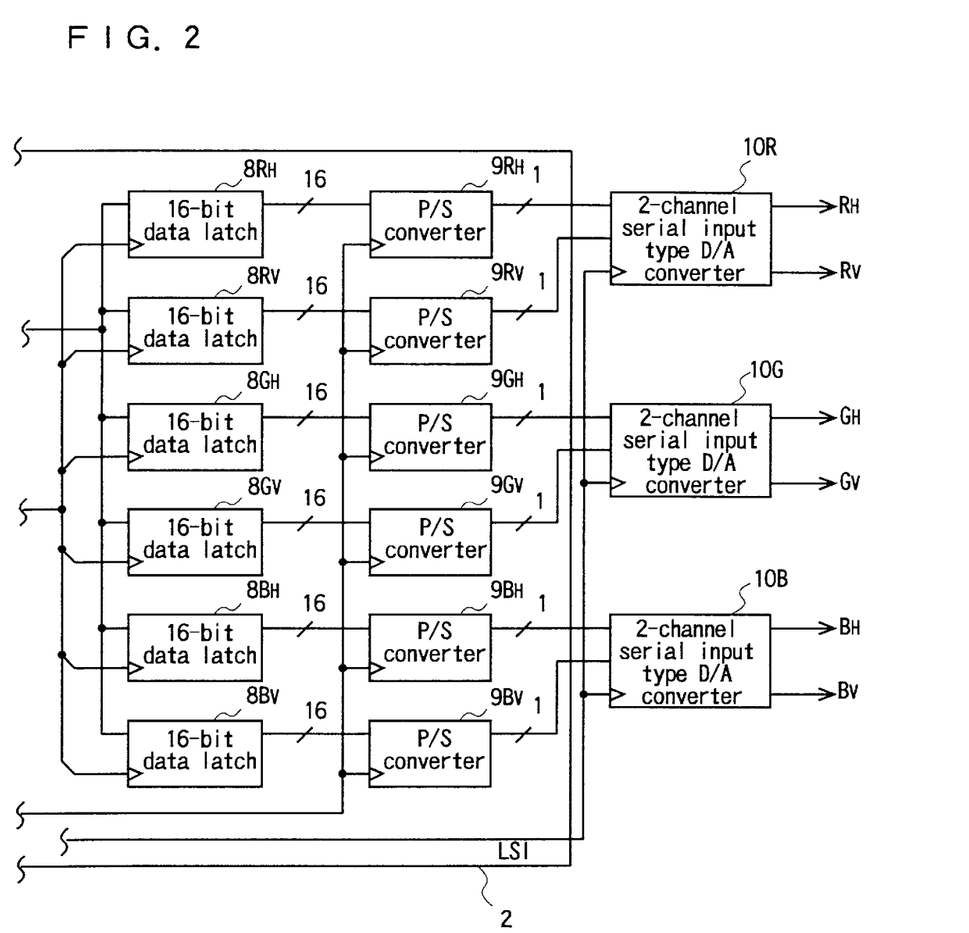
FIG. 2 is a block diagram showing a part of a digital convergence correction device of a second embodiment of the present invention.

FIG. 2 is a block diagram showing a part of a digital convergence correction device of a second embodiment of the present invention.

In this second embodiment, the digital convergence correction device has fundamentally configuration the same as that of the first embodiment except that a 2-channel serial input type D/A converter is connected with two 16-bit P/S converters. Therefore, corresponding parts and components to the first embodiment are shown by the same numerals and marks, and the description thereon made in the first embodiment similarly apply. In the following description, differences of this second embodiment from the first embodiment are mainly explained.

As shown in FIG. 2, two 16-bit P/S converters 9RH and 9RV are connected to a 2-channel serial input type D/A converter 10R. Similarly, the 16-bit P/S converters 9GH and 9GV are connected to a 2-channel serial input type D/A converter 10G, and the 16-bit P/S converters 9BH and 9BV are connected to a 2-channel serial input type D/A converter 10B.

The 2-channel D/A converter 10R converts two serial data from the 16-bit P/S converters 9RH and 9RV into the analog correction signals RH and RV, respectively, in accordance with the second timing pulse issued from the second timing pulse generator 7 shown in FIG. 1. Furthermore, the 2-channel D/A converter 10R outputs the analog correction signals RH and RV to the respective convergence coils.

Similarly, the 2-channel D/A converter 10G converts two serial data from the 16-bit P/S converters 9GH and 9GV into the analog correction signals GH and GV, respectively, in accordance with the second timing pulse issued from the second timing pulse generator 7 shown in FIG. 1. Furthermore, the 2-channel D/A converter 10G outputs the analog correction signals GH and GV to the respective convergence coils.

Similarly, the 2-channel D/A converter 10B converts two serial data from the 16-bit P/S converters 9BH and 9BV into the analog correction signals BH and BV, respectively, in accordance with the second timing pulse issued from the second timing pulse generator 7 shown in FIG. 1. Furthermore, the 2-channel D/A converter 1OB outputs the analog correction signals BH and BV to the respective convergence coils.

Thus, in this second embodiment, it is possible to reduce the number of the signal lines among the D/A converters 10R, 10G, and 10B and the second timing pulse generator 7 disposed in the LSI 2 in comparison with that of the first embodiment.

Third Embodiment

Figure 3:
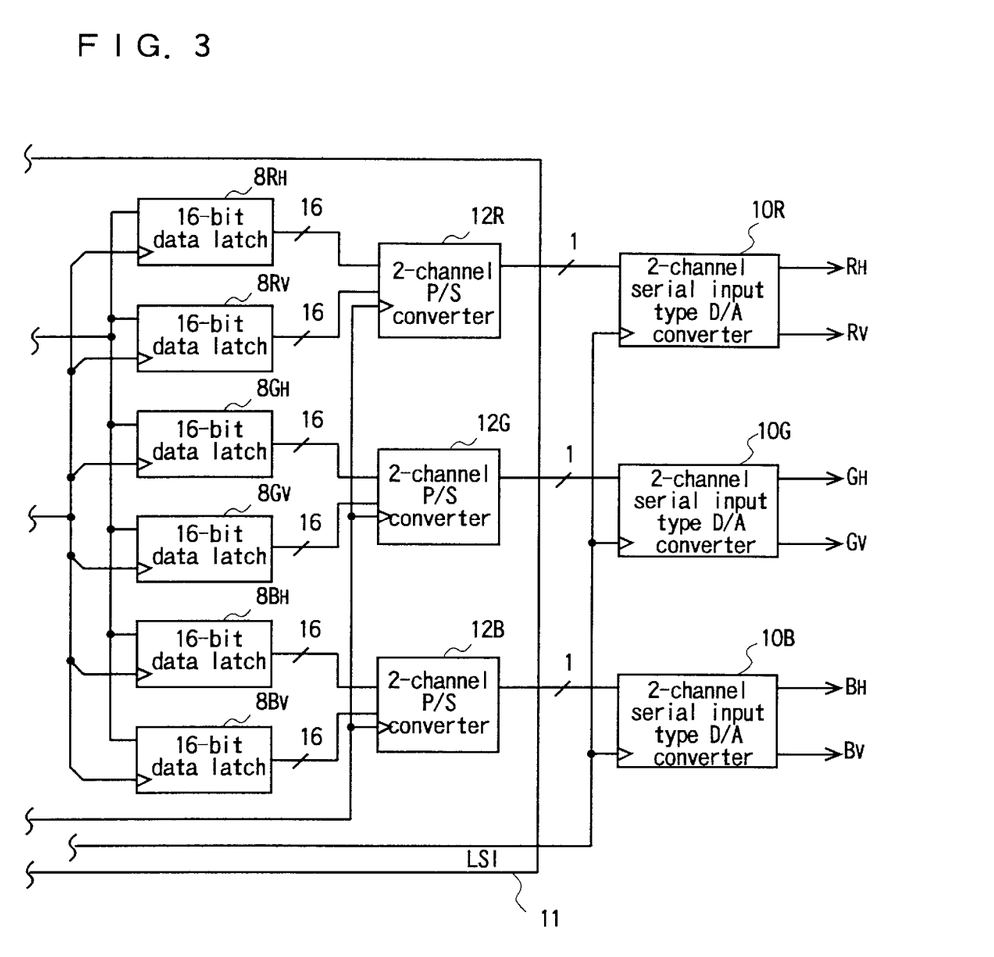
FIG. 3 is a block diagram showing a part of a digital convergence correction device of a third embodiment of the present invention.

FIG. 3 is a block diagram showing a part of a digital convergence correction device of a third embodiment of the present invention.

In this third embodiment, the digital convergence correction device has fundamentally configuration the same as that of the second embodiment except that a 2-channel P/S converter is connected with two 16-bit data latches in an LSI, and connected with the 2-channel serial input type D/A converter by one signal line. Therefore, corresponding parts and components to the second embodiment are shown by the same numerals and marks, and the description thereon made in the second embodiment similarly apply. In the following description, differences of this third embodiment from the second embodiment are mainly explained.

As shown in FIG. 3, two 16-bit data latches 8RH and 8RV are connected to a 2-channel 16-bit P/S converter 12R in a LSI 11. In the same manner, two 16-bit data latches 8GH and 8GV are connected to a 2-channel 16-bit P/S converter 12G in the LSI 11, and two 16-bit data latches 8BH and 8BV are connected to a 2-channel 16-bit P/S converter 12B in the LSI 11.

The 2-channel 16-bit P/S converters 12R, 12G, and 12B are connected with the 2-channel serial input type D/A converters 10R, 10G, and 10B by one signal line, respectively. The 2-channel 16-bit P/S converter 12R converts two 16-bit correction data from the two 16-bit data latches 8RH and 8RV into the two serial data, respectively, in accordance with the first timing pulse issued from the first timing pulse generator 6 shown in FIG. 1.

Similarly, the 2-channel 16-bit P/S converter 12G converts two 16-bit correction data from the two 16-bit data latches 8GH and 8GV into the two serial data, respectively, in accordance with the first timing pulse issued from the first timing pulse generator 6 shown in FIG. 1.

Furthermore, the 2-channel 16-bit P/S converter 12B converts two 16-bit correction data from the two 16-bit data latches 8BH and 8BV into the two serial data, respectively, in accordance with the first timing pulse issued from the first timing pulse generator 6 shown in FIG. 1.

Thus, in this third embodiment, the 2-channel 16-bit P/S converters 12R, 12G, and 12B are connected with the 2-channel serial input type D/A converters 10R, 10G, and 10B by one signal line, respectively. Thereby, it is possible to reduce the number of the signal lines among the LSI 11 and the D/A converters 10R, 10G, and 10B in comparison with that of the second embodiment.

Fourth Embodiment

Figure 4:
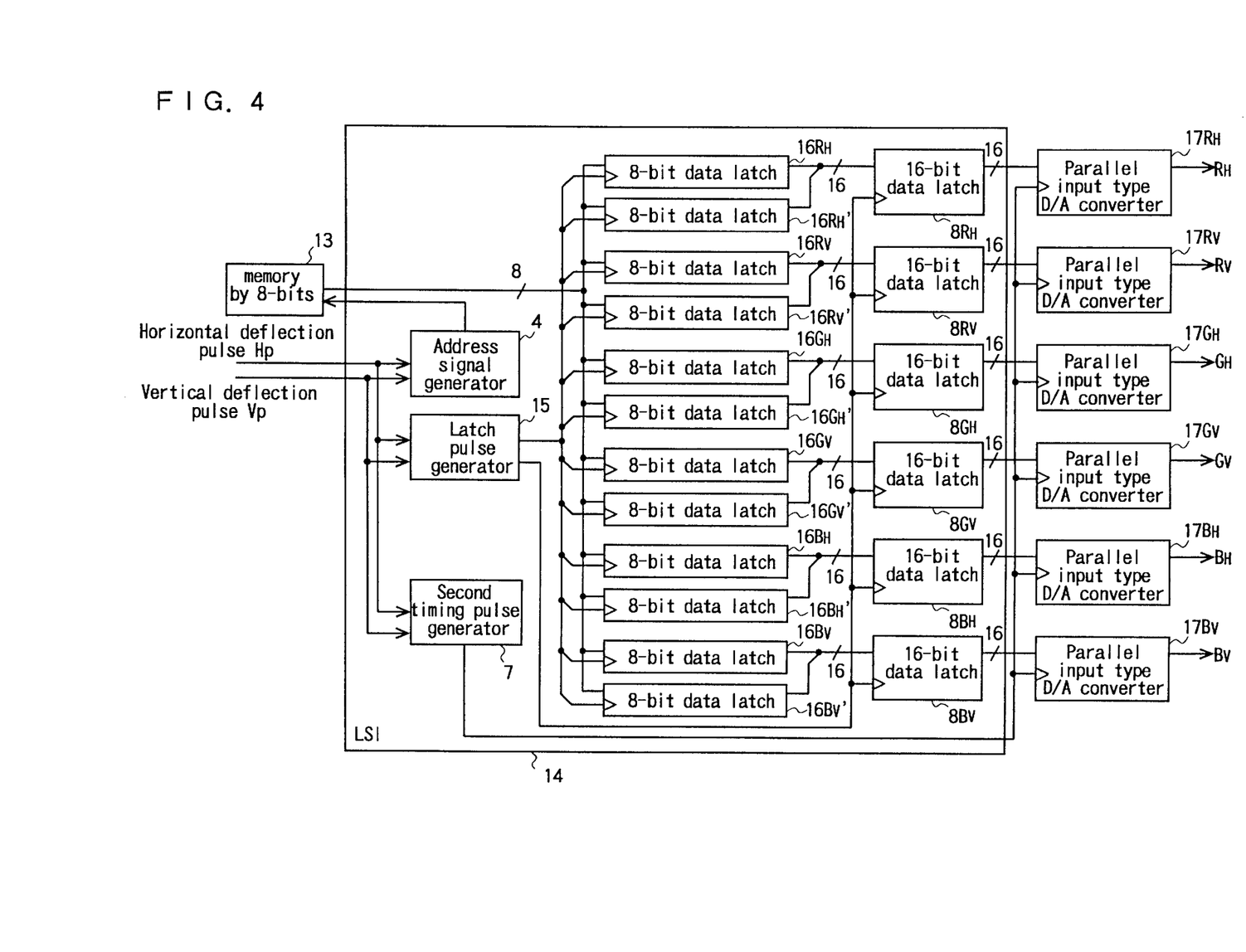
FIG. 4 is a block diagram showing a digital convergence correction device of a fourth embodiment of the present invention.

FIG. 4 is a block diagram showing a digital convergence correction device of a fourth embodiment of the present invention.

This fourth embodiment has the same construction as the first embodiment except that a memory by 8-bits is used to store the correction data instead of the memory by 16-bits, and that the 16-bit correction data are formed by correction data from the memory by 8-bits in an LSI, and further converted into the analog correction signals by six parallel input type D/A converters. Therefore, corresponding parts and components to the first embodiment are shown by the same numerals and marks, and the description thereon made in the first embodiment similarly apply. In the following description, differences of this fourth embodiment from the first embodiment are mainly explained.

As shown in FIG. 4, 8-bit correction data are outputted from a memory by 8-bits 13 to six pairs of 8-bit data latches 16RH, 16RH', 16RV, 16RV', 16GH, 16GH', 16GV, 16GV', 16BH, 16BH', 16BV, and 16BV' which are disposed in an LSI 14. Each pair of these twelve 8-bit data latches 16RH, 16RH', 16RV, 16RV', 16GH, 16GH', 16GV, 16GV', 16BH, 16BH', 16BV, and 16BV' holds two series of the 8-bit correction data. Furthermore, the six pairs of 8-bit data latches 16RH, 16RH', 16RV, 16RV', 16GH, 16GH', 16GV, 16GV', 16BH, 16BH', 16BV, and 16BV' are connected with six parallel input type D/A converters 17RH, 17RV, 17GH, 17GV, 17BH, and 17BV through the 16-bit data latches 8RH, 8RV, 8GH, 8GV, 8BH, and 8BV, respectively.

For example, 8-bit data latches 16RH and 16RH' in a pair hold two series of 8-bit horizontal correction data for red in accordance with the latch pulse issued from a latch pulse generator 15, and output the two series of the 8-bit horizontal correction data for red to the 16-bit data latch 8RH. The 16-bit data latch 8RH forms the 16-bit horizontal correction data for red with the two 8-bit horizontal correction data for red.

Then, the 16-bit data latch 8RH outputs the 16-bit horizontal correction data for red to a parallel input type D/A converter 17RH based on the latch pulse issued from the latch pulse generator 15. The D/A converter 17RH then converts the 16-bit horizontal correction data for red into the analog correction signal RH in accordance with the second timing pulse issued from the second timing pulse generator 7, and outputs the analog correction signal RH to the corresponding convergence coil.

By the above-mentioned construction, in this fourth embodiment, it is possible to extend the bit length of the correction data without increasing the bit length of the memory. As a result, the precision of the correction data for the misconvergence can be easily improved. In addition, since it is unnecessary to increase the number of signal line between the LSI and the memory, the digital convergence correction device can be prevented from being enlarged in size. Furthermore, the efficient use of the memory leads to a reduction in the number of the memory needed.

Fifth Embodiment

Figure 5:
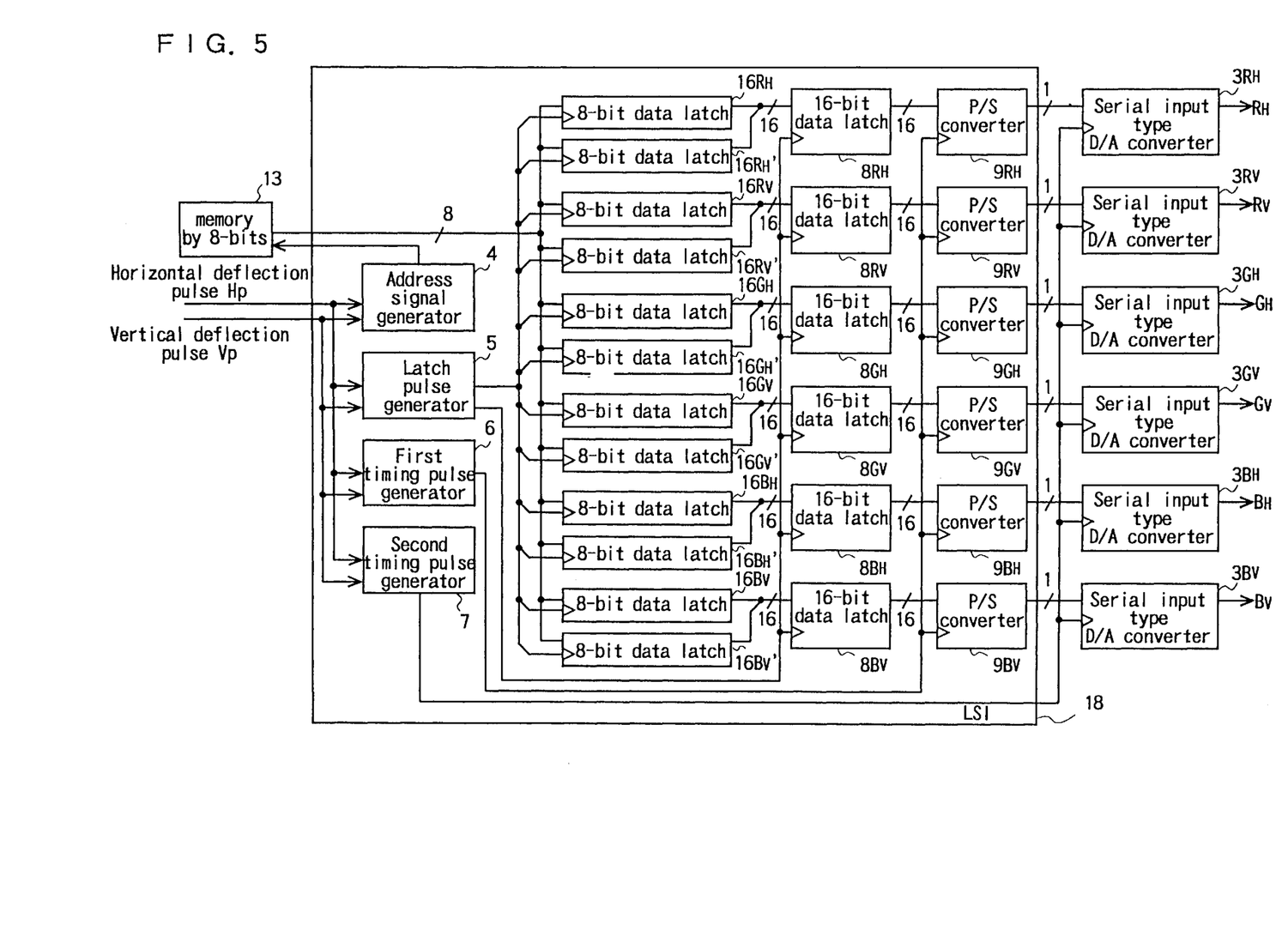
FIG. 5 is a block diagram showing a digital convergence correction device of a fifth embodiment of the present invention.

FIG. 5 is a block diagram showing a digital convergence correction device of a fifth embodiment of the present invention.

This fifth embodiment has the same construction as the fourth embodiment except that the 16-bit correction data are converted into the serial data by the 16-bit P/S converter disposed in an LSI, and that the serial data are converted into the analog correction signal by the serial input type D/A converter. Therefore, corresponding parts and components to the fourth embodiment are shown by the same numerals and marks, and the description thereon made in the fourth embodiment similarly apply. In the following description, differences of this fifth embodiment from the fourth embodiment are mainly explained.

As shown in FIG. 5, the 16-bit data latches 8RH, 8RV, 8GH, 8GV, 8BH, and 8BV are connected to the 16-bit P/S converters 9RH, 9RV, 9GH, 9GV, 9BH, and 9BV, respectively in an LSI 18. Each of the 16-bit P/S converters 9RH, 9RV, 9GH, 9GV, 9BH, and 9BV converts the 16-bit correction data into the serial data based on the first timing pulse issued from the first timing pulse generator 6, and outputs the serial data to the corresponding one of the D/A converters 3RH, 3RV, 3GH, 3GV, 3BH, and 3BV.

Each of the D/A converters 3RH, 3RV, 3GH, 3GV, 3BH, and 3BV converts the serial data into the analog correction signal based on the second timing pulse issued from the second timing pulse generator 7, and outputs the analog correction signal to the convergence coil.

By the above-mentioned construction, in this fifth embodiment, it is prevented that the digital convergence correction device is enlarged in size according to an increase in the bit length of the correction data.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A digital convergence correction device, which outputs an analog correction signal by using digital correction data, comprising:

a memory for storing multi-channel digital correction data;

at least one data latch connected to said memory for receiving and temporarily storing a portion of said multi-channel digital correction data received from said memory;

at least one parallel/serial converter connected to said at least one data latch for converting said multi-channel digital correction data received from said at least one data latch into serial data; and at least one serial input type digital/analog converter connected with said at least one parallel/serial converter for receiving said serial data and for converting said serial data into said analog correction signal.

2. A digital convergence correction device in accordance with claim 1, wherein said at least one serial input type digital/analog converter is a multi-channel serial input type digital/analog converter.

3. A digital convergence correction device in accordance with claim 2, wherein said at least one parallel/serial converter is a multi-channel parallel/serial converter.

4. A digital convergence correction device, which outputs an analog correction signal by using digital correction data, comprising:

an 8-bit wide memory for storing 8-bit digital correction data;

at least one pair of 8-bit wide data latches connected to said 8-bit wide memory for holding a sequence of two of said 8-bit digital correction data received from said 8-bit wide memory; and at least one 16-bit wide data latch connected to said at least one pair of 8-bit wide data latches for forming 16-bit wide digital correction data from said sequence of two of said 8-bit digital correction data received from said at least one pair of 8-bit data latches.

5. A digital convergence correction device in accordance with claim 4, further comprising:

at least one parallel/serial converter connected to said at least one 16-bit wide data latch for receiving said 16-bit wide digital correction data and for converting said 16-bit wide digital correction data into serial data; and at least one serial input type digital/analog converter connected with said at least one parallel/serial converter for receiving said serial data converting said serial data into said analog correction signal.

6. A digital convergence correction device, which outputs an analog correction signal by using digital correction data, comprising:

an m-bit wide memory for storing m-bit digital correction data wherein m is a natural number;

at least one of a quantity of n, m-bit wide data latches connected to said m-bit wide memory for holding a sequence of n of said m-bit digital correction data received from said m-bit wide memory wherein n is a natural number; and at least one (n×m)-bit wide data latch connected to at least one of said quantity of n, m-bit wide data latches for forming (n×m)-bit wide digital correction data from said sequence of n of said m-bit digital correction data received from said at least one of said quantity of n, m-bit data latches.

7. A digital convergence correction device in accordance with claim 6, further comprising:

at least one parallel/serial converter connected to said at least one (n×m)-bit wide data latch for receiving said (n×m)-bit wide digital correction data and converting said (n×m)-bit wide digital correction data into serial data; and at least one serial input type digital/analog converter connected with said at least one parallel/serial converter for receiving said serial data and converting said serial data into said analog correction signal.

* * * * *